(12) United States Patent
Ansley

(10) Patent No.: US 9,219,613 B1
(45) Date of Patent: Dec. 22, 2015

(54) ALTERNATIVE SET-TOP GATEWAY SOURCE FOR DOCSIS 3.0

(71) Applicant: Carol Ansley, Johns Creek, GA (US)

(72) Inventor: Carol Ansley, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 540 days.

(21) Appl. No.: 13/669,050

(22) Filed: Nov. 5, 2012

Related U.S. Application Data

(60) Provisional application No. 61/555,532, filed on Nov. 4, 2011.

(51) Int. Cl.
*H04N 7/173* (2011.01)
*H04L 12/18* (2006.01)
*H04N 21/6405* (2011.01)
*H04N 21/64* (2011.01)

(52) U.S. Cl.
CPC ............... *H04L 12/18* (2013.01); *H04N 21/64* (2013.01); *H04N 21/6405* (2013.01)

(58) Field of Classification Search
CPC ............................ H04N 21/64; H04N 21/6405
USPC ................................................ 725/98, 93, 94
See application file for complete search history.

(56) References Cited

U.S. PATENT DOCUMENTS

| | | | |
|---|---|---|---|
| 8,544,051 B1 * | 9/2013 | Ramakrishnan et al. | 725/111 |
| 8,724,639 B2 * | 5/2014 | Mahmoud | 370/401 |
| 2003/0037331 A1 * | 2/2003 | Lee | 725/32 |
| 2006/0225118 A1 * | 10/2006 | Rolls et al. | 725/118 |
| 2009/0059923 A1 * | 3/2009 | Guo et al. | 370/390 |
| 2010/0046383 A1 * | 2/2010 | Williams et al. | 370/252 |
| 2011/0274179 A1 * | 11/2011 | Holden | 375/240.25 |

* cited by examiner

*Primary Examiner* — Pankaj Kumar
*Assistant Examiner* — Sahar Baig
(74) *Attorney, Agent, or Firm* — Susan R. Payne

(57) ABSTRACT

Methods, systems, and apparatuses can operate to convert static multicast stream to dynamic multicast streams. Systems can include a static to dynamic converter operating to receive static multicast streams and to convert the static multicast streams into dynamic multicast streams. The dynamic multicast streams are then provided to a network edge component operable to provide multicast downstream service identifier forwarding enabled video streams to one or more media gateways enabled to receive such video streams.

15 Claims, 6 Drawing Sheets

ALTERNATIVE SET-TOP GATEWAY SOURCE FOR DOCSIS 3.0

CROSS-REFERENCE TO RELATED APPLICATIONS

This application is a non-provisional of and claims priority to the filing date of U.S. Provisional Patent Application Ser. No. 61/555,532, entitled "Alternative DOCSIS Set-top Gateway Source for DOCSIS 3.0," filed Nov. 4, 2011, which is hereby incorporated by reference as if set forth herein in its entirety.

TECHNICAL FIELD

This disclosure relates to set-top boxes, and more particularly gateway set-top boxes for DOCSIS 3.0.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) use their CATV network infrastructure for carrying voice, video on demand (VoD) and video conferencing traffic signals, among other types of traffic.

The customer premise can include various devices operable to facilitate services from the MSO. For example, a customer premise can include a cable modem, an embedded multimedia terminal adapter (EMTA), set-top box(es). Further, some solutions provide for media gateway devices whereby a gateway set-top box provides access to multiple client set-top boxes. These set-top boxes are typically operable to provide video services to subscribers for viewing on display devices (e.g., a television).

However, as IPv6 begins implementation, the media gateway may encounter issues because of the lack of multicast downstream service identifier forwarding (MDF)-enabled DOCSIS set-top gateway (DSG) in cable modem termination systems (CMTSs). For example, if an operator has deployed an initial Hybrid MPEG video model (proposed for multiple service operators (MSO)) and the operator then begins rollout of IPv6 or even trial IPv6, media gateways (MGs) with IPv6 enabled will cease providing CableCard services. Moreover, the media gateway will be unable to offer an upgrade path from the Hybrid MPEG deployment to multicast internet protocol (IP) Video.

BRIEF DESCRIPTION OF THE DRAWINGS

Like reference numbers and designations in the various drawings indicate like elements.

DETAILED DESCRIPTION

Figure 1:
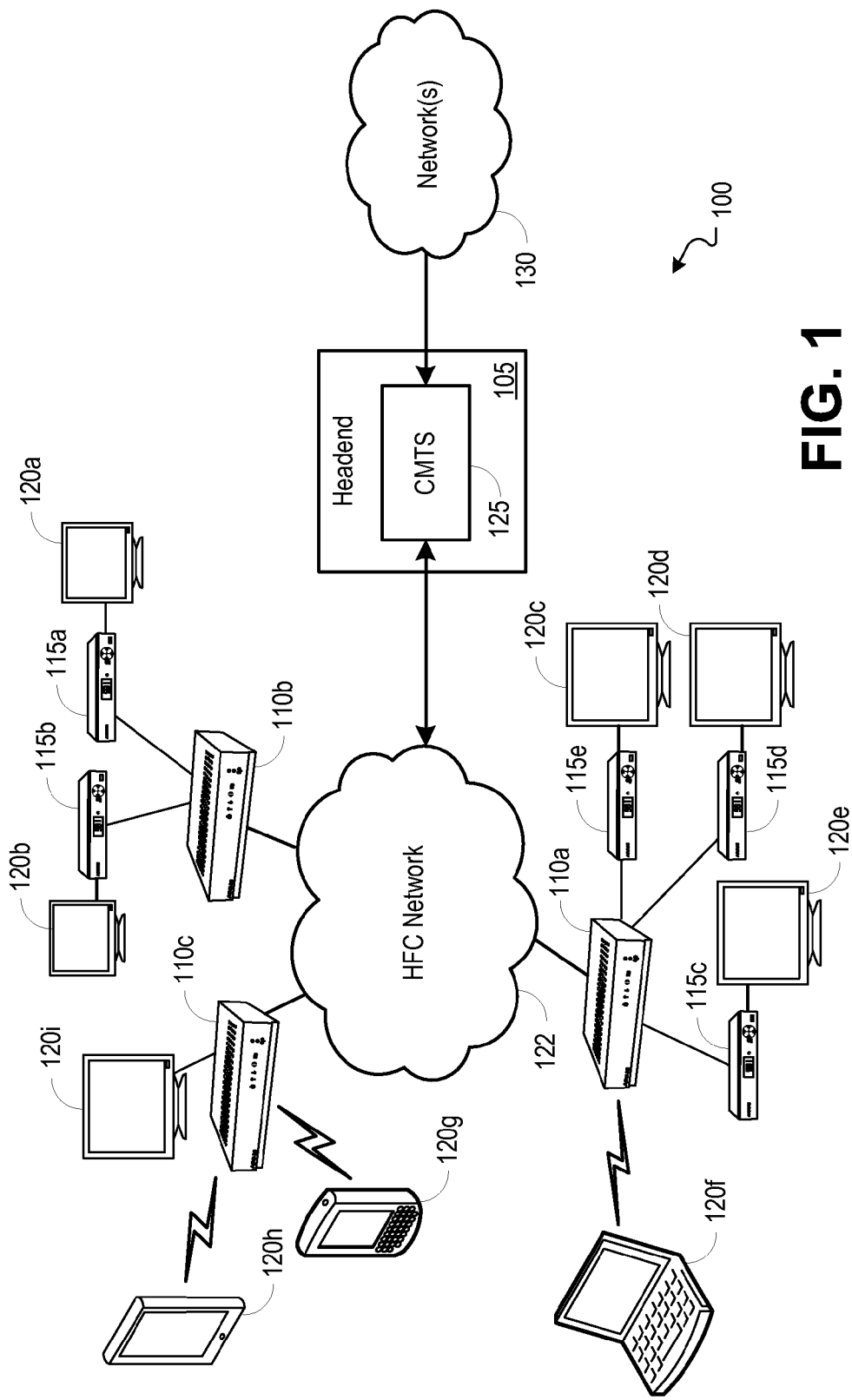
FIG. 1 is a block diagram illustrating an example network environment including video services provided via media gateway devices at the customer premise.

In some implementations of this disclosure, systems and methods can operate to convert a static multicast video stream to a dynamic multicast video stream for multicast downstream service identifier forwarding (MDF) enabled DOCSIS set-top gateway (DSG) devices. Because DSG devices cannot support both static and dynamic, when a CMTS begins providing an MDF-enabled multicast, the CMTS will be unable to process the incoming static video for the DSG device. A static to dynamic multicast converter can operate to convert a static multicast video stream to a dynamic multicast video stream, thereby facilitating operations FIG. 1 is a block diagram illustrating an example network environment 100 including video services provided via media gateway devices at the customer premise. In some implementations, a headend 105 can provide video, data and/or voice service(s) to customer premise equipment (CPE) devices 110a-c in one or more subscriber groups (e.g., service group(s)). The CPE devices 110a-c can include, for example, DSG devices 110a-c, or legacy set-top boxes, among others. Set top boxes (e.g., including DSG 110a-c) can facilitate communications from the headend 105 to a television or a digital video recorder. In various implementations, the DSG devices 110a-c can facilitate additional services such as data and voice and/or video telephony services.

In some implementations, the DSG devices 110a-c can provide a host for set-top client devices 115a-e. The set-top client devices 115a-e can provide a video feed for display on display devices 120a-e. In additional or alternative implementations, the DSG devices 110a-c can provide media directly to a display device 120f-i. In some implementations, the display devices 120f-h can be mobile communications devices such as tablet computers 120h, cellular devices 120g (e.g., "smartphones"), or laptop computers 120f. The video services to the mobile devices 120f-h can be provided, for example, via wireless link (e.g., any Institute of Electrical and Electronics Engineers (IEEE) 802.11 standard, Wi-Max standard, Bluetooth™ standard, or other radio frequency standard). Alternatively or additionally, the video feed from a DSG device (e.g., DSG device 110c) can also be provided via a wired link to a television 120i.

The DSG devices 110a-c can communicate both to and from the headend 105 via a hybrid fiber-coax (HFC) network 122. The headend 105 can include devices such as a cable modem termination system (CMTS) 125 and/or an edge quadrature amplitude modulation (EQAM) device (not shown), or a combined or converged device (not shown) including multiple edge and/or video or data processing functionalities. Such devices can operate to facilitate communications between a network 130 and the CPE devices 110a-d. In various implementations, the network 130 can include one or more networks internal to the headend and/or one or more networks external to the headend (e.g., one or more extranets, the Internet, etc.).

Data services (e.g., including VoIP, over the top (OTT) video, etc.) can be handled by the headend 105 through a CMTS 125. The CMTS 125 can receive data signals from external device(s) or nodes through network(s) 130. The network(s) 130, for example, can operate using internet protocol (IP), sending data packets to and receiving data packets from the headend 105. In various examples, one or more video sources may provide streaming data through the network(s) 130 to the CMTS 125. In some implementations, the CMTS 125 can forward packets destined for subscribers to a modulation device (e.g., an EQAM) used to modulate the signal onto a carrier waveform. In other implementations, the CMTS 125 can modulate the packets internally and transmit the signal to a combiner for transmission.

Figure 2A:
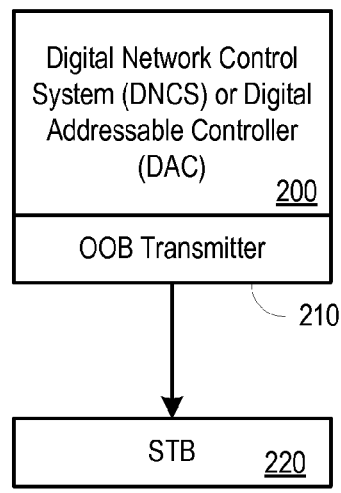
FIGS. 2A-D are block diagrams showing a network path for video and illustrating the problem with the planned deployment.

FIGS. 2A-D are block diagrams illustrating the evolution of the network path for video, thereby helping to illustrate problems with the planned deployment of IPv6 services. FIG. 2A is a block diagram showing a network path for legacy type video and assisting to illustrate the problem with the planned deployment of IPv6 services. In this example, a digital network control system (DNCS) or a digital addressable controller (DAC) provides multicast video for transmission to a customer to an out-of-band (OOB) transmitter 210. The OOB transmitter was operable to modulate the video signal and transmit the signal to a legacy-type set-top box 220. In this implementation, The original HE Controller (DNCS or DAC) to STB communication path was an Out-Of-Band path that used a separate QPSK carrier in the DS.

Figure 2B:
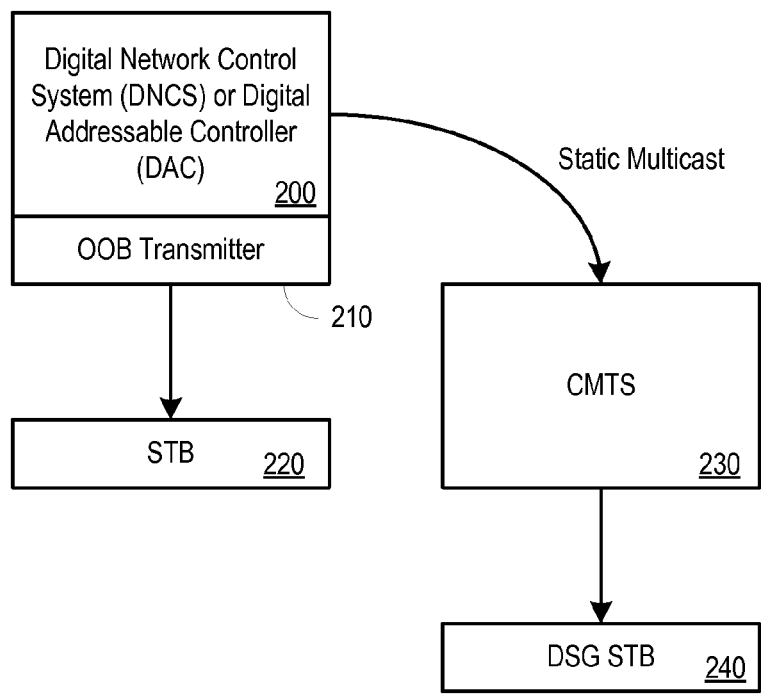

FIG. 2B is a block diagram showing a network path for video using legacy video transmission and addressable multicast. In this example, the legacy systems are used to transmit the video out-of-band to a legacy set-top box, similarly to that described in FIG. 2A. Additionally, the DNCS or DAC provides a static multicast signal to a CMTS 230. The CMTS 230 can then provide the statically addressed multicast stream to a DSG device 240.

In this implementation, the DNCS or DAC 200 is operable to take the same traffic from the headend (HE) controller and route it over a simple statically configured multicast to a CMTS 230. The CMTS 230 is configured to duplicate the statically configured multicast stream to all provisioned downstream channels. The CMTS 230 in this implementation also announces the multicast address to all cable modems (CMs) in a media access control (MAC) downstream channel descriptor (DCD) message.

Figure 2C:
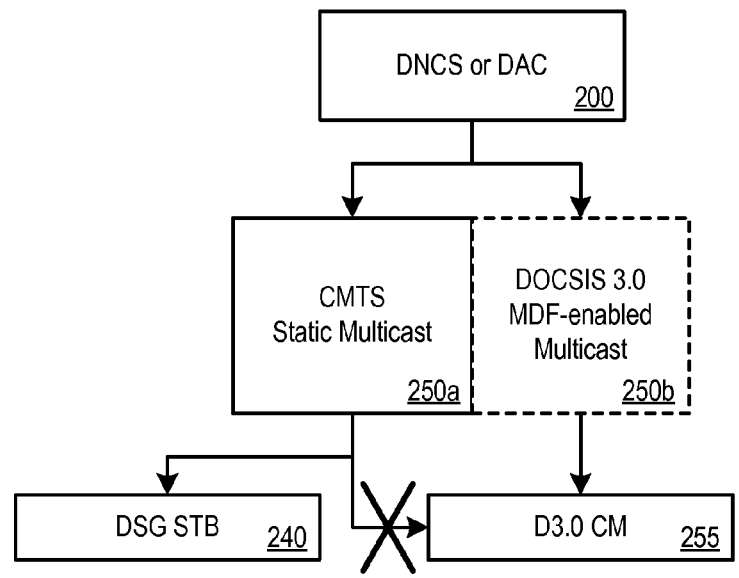

FIG. 2C is a block diagram showing a network path for video and illustrating the problem with the planned deployment. Those skilled in the art should appreciate that multicast addressing was changed in D3.0 to utilize DSID forwarding (Multicast DSID Forwarding or MDF). Moreover, the DSG MAC messaging was changed to add DSID references. A D3.0 cable modem (CM) ignores any multicast not labeled with DSIDs per the DOCSIS 3.0 (D3.0) specification if its MAC domain is MDF-enabled. The DOCSIS 3.0 specifications are available from Cable Television Laboratories, Inc. (CableLabs) of Louisville, Ky., the disclosures of which are hereby incorporated by reference in their entirety as if set forth herein.

Thus, in the example system of FIG. 2, the DNCS or DAC provides the video signal to the CMTS 250, which includes both static multicast functionality 250a, and MDF-enabled multicast functionality 250b. A DSG-STB 240 in a static multicast group can continue to receive the static multicast video stream. Moreover, a D3.0 CM in an MDF-enabled multicast group can receive the MDF-enabled stream, but can no longer receive the static multicast, per the D3.0 specification.

Figure 2D:
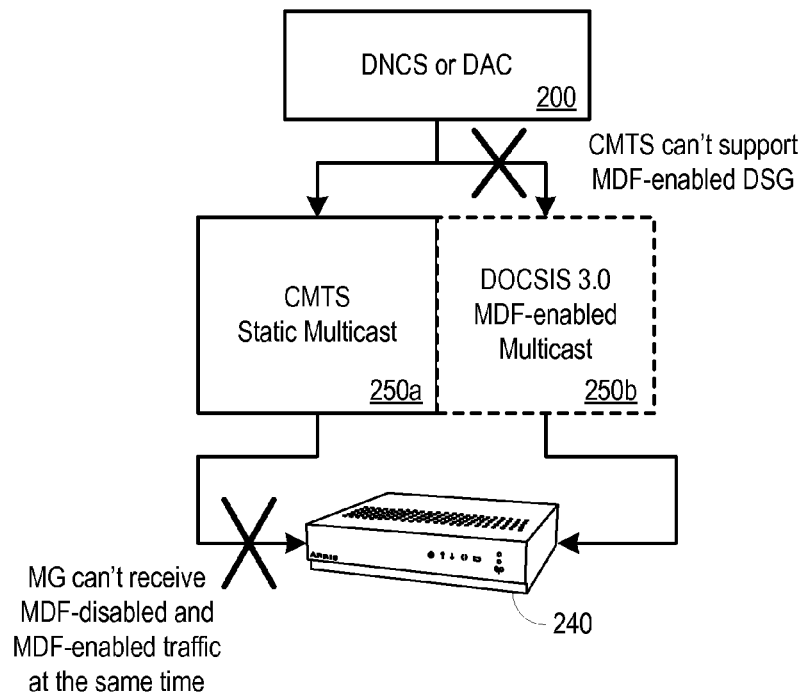

FIG. 2D is a block diagram showing a network path for video and illustrating the problems that result from prohibiting the ability to simultaneously receive statically address multicast video and MDF-enabled multicast. In this example, the DNCS or DAC 200 provides video to the CMTS 250. The DSG 240 decrypts traffic with its CableCard and provides two-way services with the MG. The CMTS can provide non-DSID DSG channels 250a until the operator wants to provide IPv6 or any other service, such as IP Video, that uses multicast. However, if the CMTS 250 enables downstream service identifier (DSID)-based multicast forwarding 250b, then the media gateway (MG) 240 will lose its DSG path, since the hardware cannot receive MDF-enabled and MDF-disabled traffic at the same time.

Figure 2E:
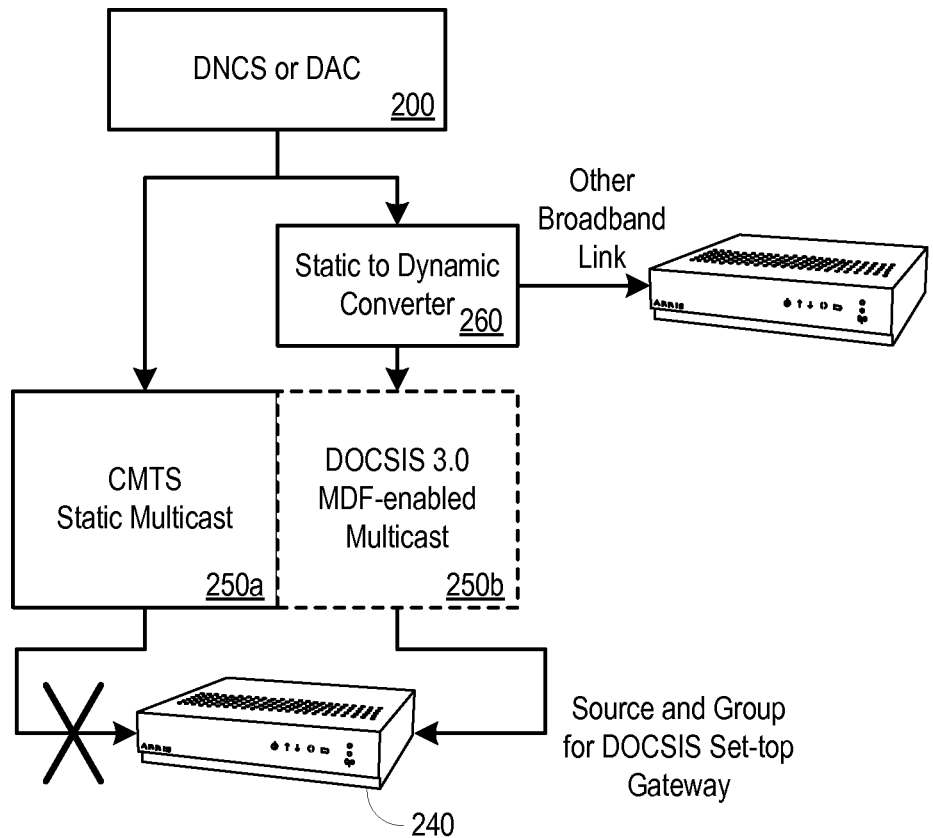
FIG. 2E is a block diagram showing a network path for video including a static to dynamic converter operable to alleviate the problems with the planned deployment.

FIG. 2E is a block diagram showing a network path for video including a static to dynamic converter 260 operable to alleviate the problems with the planned deployment. In one implementation, the problem identified in FIG. 2D can be resolved by introducing a new network element (static to dynamic multicast converter 260) which is operable to convert existing headend (HE) controller static multicast video streams to dynamic multicast video streams. The MG 240 can then access the dynamic multicast video streams using an IGMPv3 Join command. In some implementations, the MG 240 can use a new MIB object or type length value (TLV) to identify the source and group (S,G) to use to join the DSG flow.

In some implementations, the static to dynamic converter can also be used to facilitate access to the multicast stream by one or more other broadband media link(s). For example, if an MSO operated both an HFC and digital subscriber line, or FTTH network, the static to dynamic converter can be used to source dynamically addressed multicast video streams for those other types of networks. Thus, in various implementations, the CMTS may be replaced by a digital subscriber line access multiplexer (DSLAM) or fiber multiplexer depending on the legacy configuration of the existing network.

In additional or alternative implementations, the static to dynamic converter 260 can be integrated into a CMTS 250 or DSLAM (not shown). In such implementations, the static to dynamic converter may be a card or blade within the network edge device.

Figure 3:
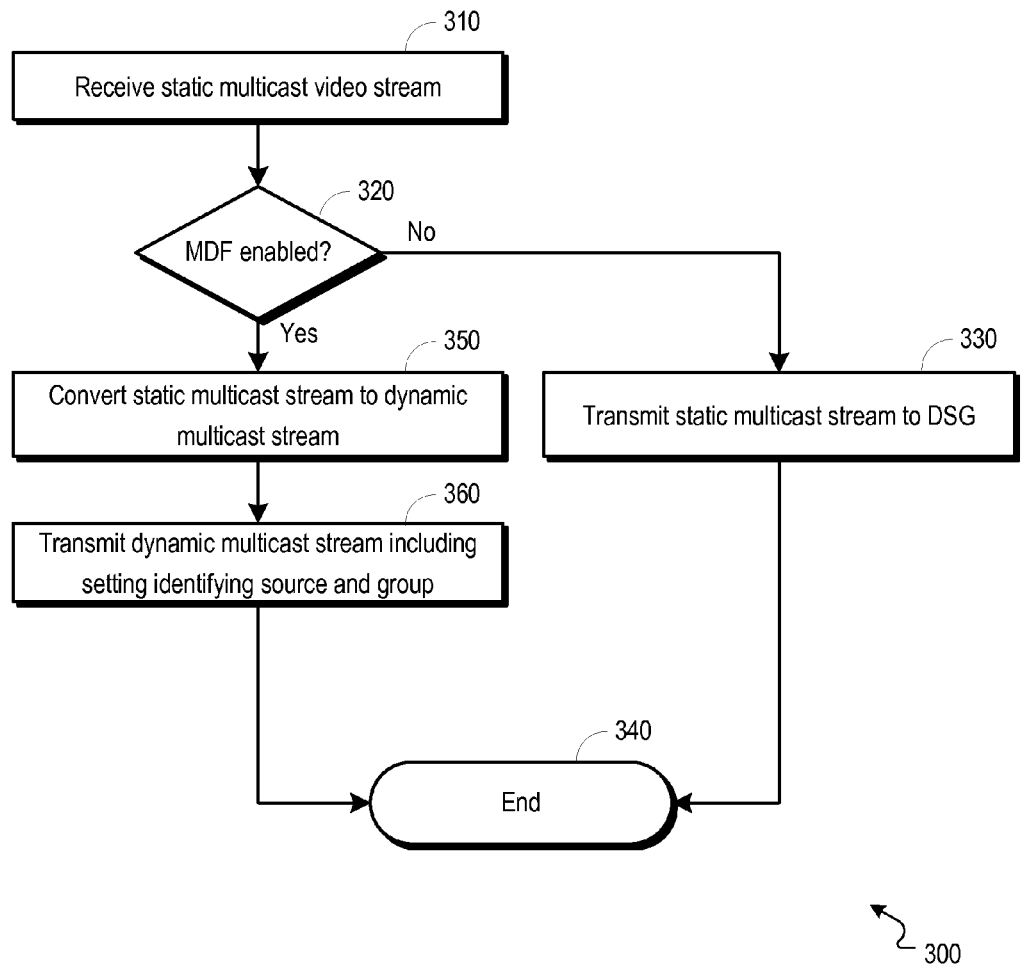
FIG. 3 is a block diagram illustrating another example process operable to convert static multicast video streams to dynamic multicast video streams supported by media gateway devices.

FIG. 3 is a block diagram illustrating another example process operable to convert static multicast video streams to dynamic multicast video streams supported by media gateway devices. At stage 310, a static multicast stream is received. The static multicast stream can be received, for example, by a multicast converter (e.g., static to dynamic converter 260 of FIG. 2E). The multicast converter can be used to convert a statically addressed multicast signal to a dynamically addressed multicast signal. Thus, in situations where an MSO has begun providing IPv6 services, multicast converter can operate to convert the static multicast to a dynamic multicast.

At stage 320, a determination is made whether MDF is enabled. The determination of whether MDF is enabled can be made, for example, by the converter (e.g., static to dynamic converter 260 of FIG. 2E) in conjunction with a CMTS device (e.g., CMTS 250 of FIG. 2E). In some implementations, the CMTS can communicate to the converter to identify whether or not an MDF enabled service group exists. In the case where MDF has not been enabled, the CMTS can continue to transmit the static multicast stream to the DSG at stage 330. The process 300 then ends at stage 340. It should be understood that in some implementations, the fact that a converter has been connected to the CMTS device can be indicative that MDF-enabled multicast service groups exist, and therefore, there is no point in determining whether the multicast is MDF-enabled.

Returning to stage 320, if the multicast is MDF-enabled, the process 300 proceeds to stage 350, where the static multicast stream is converted to a dynamic multicast stream. The static multicast stream can be converted to a dynamic multicast stream, for example, by a converter (e.g., static to dynamic converter 260 of FIG. 2E). The static addressing on the multicast stream can be converted to a dynamic addressing in order to deceive a cable card module on the device into believing that the stream is being received for consumption by the cable card.

At stage 360, the dynamic multicast stream is transmitted. The dynamic multicast stream can be transmitted, for example, by the converter (e.g., static to dynamic converter 260 of FIG. 2E) in conjunction with the CMTS (e.g., MDF-enabled multicast functionality of the CMTS 250b of FIG. 2E). In some implementations, the dynamic multicast stream can include a setting identifying the source and group associated with the multicast stream. In such implementations, a MIB object or TLV setting can be provided which is operable to assist the DSG in identifying the source and group information included in the dynamic multicast stream.

Figure 4:
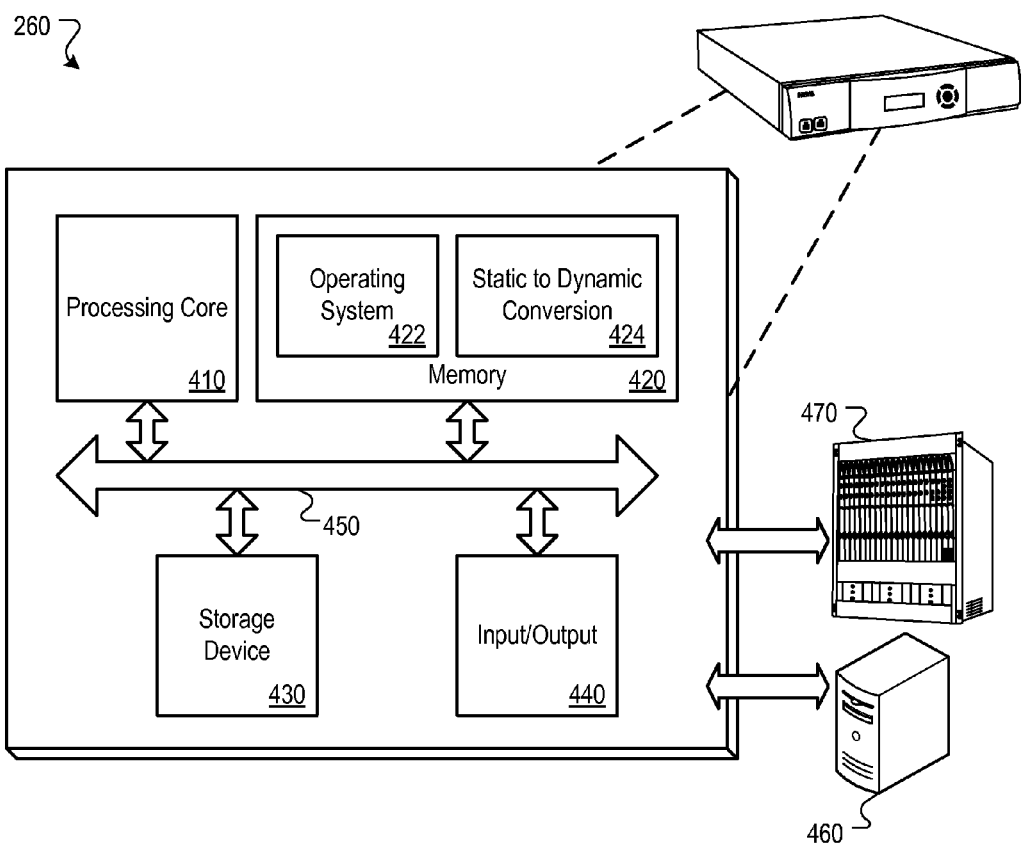
FIG. 4 is a block diagram of a converter operable to convert static multicast video streams to dynamic multicast video streams.

FIG. 4 is a block diagram of an example static to dynamic converter operable to convert a static multicast stream into a dynamic multicast stream for MDF-enabled multicast services. However, it should be understood that many different kinds of network devices (e.g., including network hubs, bridges, routers, edge termination devices, etc.) can implement a packet loss identification mechanism. The converter 260 can include a processing core 410, a memory 420, a storage device 430, and an input/output device 440. Each of the components 410, 420, 430, and 440 can, for example, be interconnected using a system bus 450. The processing core 410 is capable of processing instructions for execution within the system 260. In one implementation, the processing core 410 is a single-threaded processor. In another implementation, the processing core 410 is a multi-threaded processor. The processing core 410 is capable of processing instructions stored in the memory 420 or on the storage device 430.

The memory 420 stores information within the device 260. In one implementation, the memory 420 is a computer-readable medium. In one implementation, the memory 420 is a volatile memory unit. In another implementation, the memory 420 is a non-volatile memory unit. The memory 420 can store program information, such as an operating system 422 and static to dynamic multicast conversion logic 424. The operating system 422 can provide an environment within which the other instructions included in the device can operate. The static to dynamic conversion logic 424 can operate to instruct the device on converting static multicast streams to dynamic multicast streams by replacing static addressing elements within the multicast with dynamic addressing elements within the multicast stream.

In some implementations, the storage device 430 is capable of providing mass storage for the device 260. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the device 260. In one implementation, the input/output device 440 can include one or more of a network interface device, e.g., an Ethernet card or other type of interface dependent upon the interfaces used by connecting devices. For example, the input/output device can include driver devices configured to receive input data and send output data to other input/output devices, such as one or more controller devices 460 (e.g., DNCS, DAC, etc.), as well as sending communications to, and receiving communications from a CMTS 470. Other implementations, however, can also be used, such as mobile computing devices, mobile communication devices, set-top box television client devices, etc.

The static to dynamic multicast converter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMA-Script instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system, comprising:
a controller operable to produce a static multicast video stream;
a static to dynamic multicast converter operable to receive the static multicast video stream and to convert the static addressing to dynamic addressing to produce a dynamic multicast video stream;
a network edge device operable to receive the dynamic multicast video stream from the static to dynamic multicast converter and to produce a multicast transmission having multicast downstream service identifier forwarding enabled for a first service group to which the dynamic multicast video stream is being provided; and
the network edge device being operable to transmit the multicast transmission having multicast downstream service identifier forwarding enabled to a plurality of media gateways operable to receive the multicast stream having multicast downstream service identifier forwarding enabled and to provide the dynamic multicast video stream to one or more associated display devices, wherein the plurality of media gateways are not operable to simultaneously process both the static multicast video stream and multicast downstream service identifier forwarding enabled dynamic multicast video stream.

2. The system of claim 1, wherein the static to dynamic multicast converter is operable to provide at least one secondary output to one or more secondary broadband links.

3. The system of claim 1, wherein the network edge device comprises a cable modem termination system.

4. The system of claim 1, wherein the network edge device and the static to dynamic converter are integrated into a single device.

5. The system of claim 1, wherein the network edge device is further operable to provided static multicast streams to a second service group independent of the first service group.

6. The system of claim 1, wherein the multicast downstream service identifier forwarding enabled multicast stream comprises source and group information associated with the stream.

7. The system of claim 6, wherein a management information base object or type length value parameter are defined to communicate the source and group information to a plurality of media gateways in the first service group.

8. A computer-implemented method, comprising:
receiving a static multicast video stream signal;
converting the static multicast video stream signal to produce a dynamic multicast video stream;
receiving the dynamic multicast video stream at a network edge component;
transmitting the dynamic multicast video stream to a first service group having multicast downstream service identifier forwarding enabled to a plurality of media gateways in the first service group, wherein the media gateways are not operable to simultaneously process both static multicast video streams and multicast downstream service identifier forwarding enabled multicast video streams; and wherein the plurality of media gateways provide the video information contained in the dynamic multicast video stream to one or more associated display devices.

9. The computer implemented method of claim 8, further comprising providing the dynamic multicast stream to at least one secondary output operable to transmit the dynamic multicast stream to subscribers via one or more secondary broadband links.

10. The computer implemented method of claim 8, wherein the network edge component comprises a cable modem termination system.

11. The computer implemented method of claim 8, wherein converting the static multicast stream into a dynamic multicast stream is performed by a cable modem termination system.

12. The computer implemented method of claim 8, further comprising providing the static multicast stream to a second service group independent of the first service group.

13. The computer implemented method of claim 8, further comprising adding source and group information to the dynamic multicast video stream.

14. The computer implemented method of claim 13, wherein a management information base object or type length value parameter are defined to communicate the source and group information to a plurality of media gateways in the first service group.

15. One or more non-transitory computer readable media operable to execute on a processor, the computer readable being operable to cause the processor to perform the operations comprising:

receiving a static multicast video stream signal;

converting the static multicast video stream to produce a dynamic multicast video stream;

receiving the dynamic multicast video stream at a network edge component;

transmitting the dynamic multicast video stream to a first service group having multicast downstream service identifier forwarding enabled;

determining existence of one or more devices belonging to the first service group, the first service group comprising those devices having multicast downstream service identifier forwarding enabled; and terminating the conversion of static multicast video to dynamic multicast video responsive to a determination that the first service group does not include one or more devices.

* * * * *